May 1, 1928.  L. O. GRONDAHL  1,668,243

RAILWAY TRAFFIC CONTROLLING APPARATUS

Filed March 11 1927

INVENTOR:
L. O. Grondahl,
by A. R. Vernill
His attorney

Patented May 1, 1928.

1,668,243

UNITED STATES PATENT OFFICE.

LARS O. GRONDAHL, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA.

RAILWAY-TRAFFIC-CONTROLLING APPARATUS.

Application filed March 11, 1927. Serial No. 174,512.

My invention relates to railway traffic controlling apparatus, and particularly to automatic train controlling apparatus of the intermittent inductive type.

I will describe two forms of apparatus embodying my invention, and will then point out the novel features thereof in claims.

Figure 1:
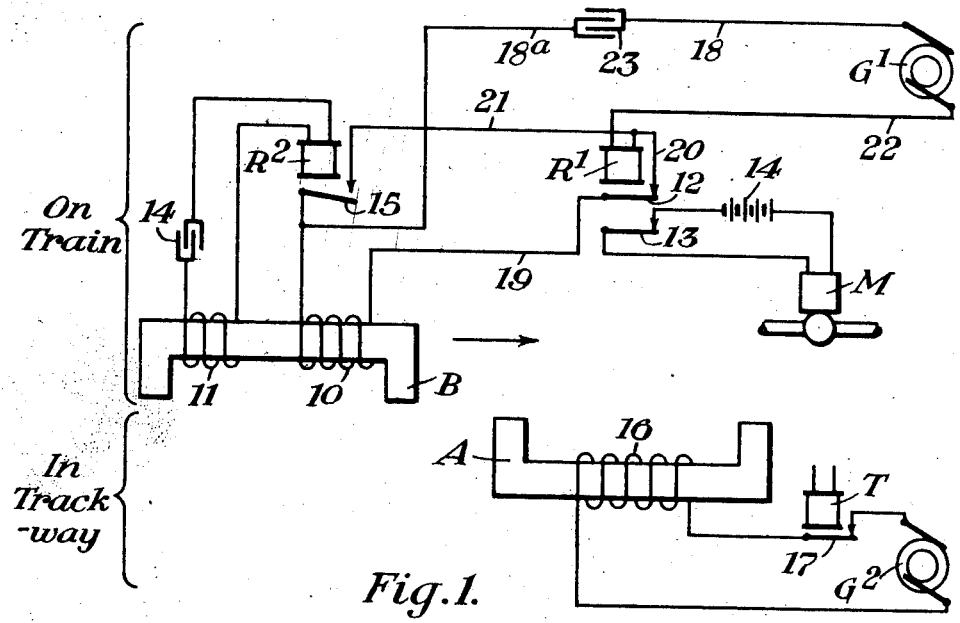
Figure 2:
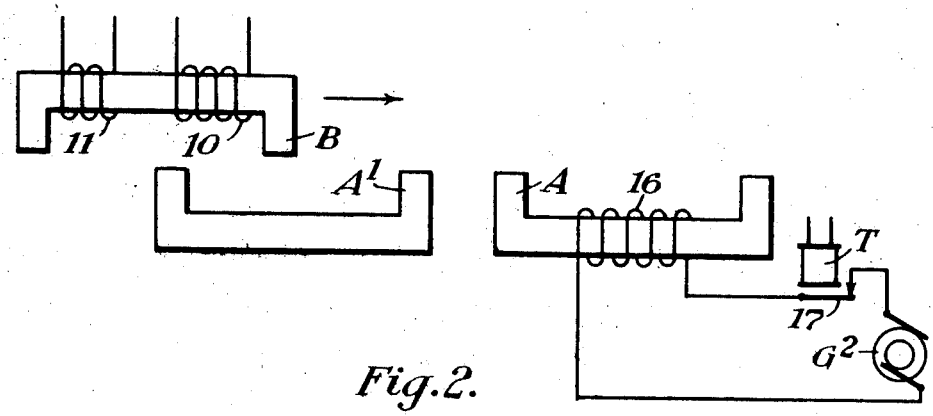

In the accompanying drawing, Fig. 1 is a diagrammatic view illustrating one form of apparatus embodying my invention. Fig. 2 is a diagrammatic view illustrating a modification of the trackway portion of the apparatus shown in Fig. 1, and also embodying my invention.

Similar reference characters refer to similar parts in each of the views.

Referring first to Fig. 1, the reference character A designates a magnetizable inductor located in the trackway and provided with a winding 16. This winding is at times supplied with alternating current from a generator $G^2$, the circuit for winding 16 being controlled by a contact 17 of a relay T, which relay may be controlled in any suitable manner by traffic conditions in advance.

Located on the train is a magnetizable receiver B having two windings 10 and 11. Associated with the first winding 10 is a relay $R^1$, the normal circuit for this relay being from a generator $G^1$ through wire 18, condenser 23, wire $18^a$, winding 10, wire 19, front contact 12 of relay $R^1$, wire 20, winding of relay $R^1$ and wire 22 to generator $G^1$. The condenser 23 may be omitted if desired, although the use of this condenser will improve the operation of the apparatus. The frequency of the current delivered by generator $G^1$ is preferably different from the frequency of the current delivered by the trackway generator $G^2$. Relay $R^1$ controls any suitable train governing means, such, for example, as brake application magnet M. Magnet M is provided with a circuit which includes a source of current 14 and a front contact 13 of relay $R^1$. When magnet M becomes de-energized, it causes an automatic application of the train brakes.

The second winding 11 on the receiver B is provided with a circuit which includes a relay $R^2$ and a condenser 14. This circuit is tuned to resonance at the frequency of the trackway generator $G^2$. Relay $R^2$ is normally open, but when it is closed it closes an auxiliary circuit for relay $R^1$, which circuit is from generator $G^1$ through wire 18, condenser 23, wire $18^a$, front contact 15 of relay $R^2$, wire 21, winding of relay $R^1$ and wire 22 to generator $G^1$.

Owing to the fact that the circuit for relay $R^2$ is tuned to resonance at the frequency of generator $G^2$, this relay will not be energized by the alternating current induced in winding 11 by the alternating current from generator $G^1$ flowing in winding 10. Relay $R^2$ will, however, be momentarily energized when the receiver B passes over the trackway inductor A if winding 16 is energized, but not if this winding is deenergized.

The operaton of the apparatus shown in Fig. 1, is as follows: Normally relay $R^1$ is closed, so that magnet M is energized with the result that this magnet does not cause an application of the brakes. When the receiver B passes over a trackway inductor A, one effect of this inductor will be to increase the impedance of winding 10. If relay $R^2$ remains open, the increased impedance of winding 10 will cause the current in relay $R^1$ to be reduced to such value that this relay will open and cause an automatic application of the brakes. If, however, trackway relay T is closed, the alternating current flowing in winding 16 of the trackway inductor will cause relay $R^2$ to be closed momentarily, thereby closing the auxiliary circuit for relay $R^1$ and preventing the latter relay from opening.

It will be seen from the foregoing, that when the trackway relay T is open, relay $R^1$ will be opened when the receiver B passes the inductor A and will remain open until the receiver passes another inductor which is supplied with alternating current, or until suitable resetting apparatus not shown in the drawing is operated.

It is, of course, possible that under some conditions winding 16 on the trackway inductor may become closed on itself. The parts are preferably so designed that if this should occur the effect of the inductor A on the receiver B will still be such as to increase the impedance of winding 10 to a sufficient degree to cause relay $R^1$ to open. If it is difficult to design the parts to take care of this condition, the modification shown in Fig. 2 may be used. Referring to this view, the train-carried apparatus may be the same as in Fig. 1, but the trackway apparatus comprises two inductors A and A¹ located one immediately in advance of the other. Inductor A is provided with a winding 16 which is controlled in the same manner as in Fig. 1, but inductor A¹ is not provided with a winding. When the receiver B passes over the inductor A¹, the impedance of winding 10 will always be increased to such value that relay R¹ will open, but a short time interval will occur before the application of the brakes actually begins. Prior to the application of the brakes the receiver B passes over the second inductor A, and if this inductor is energized relay R² will become closed, so that relay R¹ will again close and will prevent the automatic application of the brakes.

Other means may be employed for insuring an automatic application of the brakes in the event of winding 16 becoming accidentally closed on itself.

One important feature of my invention is the fact that if the trackway relay T is closed, an automatic application of the brakes will be prevented regardless of the speed of the train, and that if the trackway relay T is open, an automatic application will occur regardless of the speed of the train. In other words, apparatus embodying my invention has no low speed limit.

Although I have herein shown and described only two forms of apparatus embodying my invention, it is understood that various changes and modifications may be made therein within the scope of the appended claims without departing from the spirit and scope of my invention.

Having thus described my invention, what I claim is:

1. Railway traffic governing apparatus comprising a train carried magnetic receiver having two windings, a circuit for the first winding including a source of alternating current and a first relay and a front contact of said relay, a trackway inductor co-operating with said receiver to reduce the current in said circuit to such value as to open said first relay, a winding on said inductor, means for at times supplying said inductor winding with alternating current, a circuit for the second receiver winding including a second relay responsive to the flux induced in said receiver by alternating current in said inductor winding but not to flux created in the receiver by alternating current in the first receiver winding, means operating when said second relay is closed for preventing said first relay from being opened due to the influence of the trackway inductor, and governing means on the train controlled by said first relay.

2. Railway traffic governing apparatus comprising a train carried magnetic receiver having two windings, a circuit for the first winding including a source of alternating current and a first relay and a front contact of said relay, a trackway inductor co-operating with said receiver to reduce the current in said circuit to such value as to open said first relay, a winding on said inductor, means for at times supplying said inductor winding with alternating current of a different frequency from that of the source on the train, a circuit for the second receiver winding tuned to resonance at the frequency of said trackway source and including a second relay, means operating when said second relay is closed for preventing said first relay from being opened due to the influence of the trackway inductor, and governing means on the train controlled by said first relay.

3. Railway traffic governing apparatus comprising a train carried magnetic receiver having two windings, a circuit for the first winding including a source of alternating current and a first relay and a front contact of said relay, a trackway inductor co-operating with said receiver to reduce the current in said circuit to such value as to open said first relay, a winding on said inductor, means for at times supplying said inductor winding with alternating current, a circuit for the second receiver winding including a second relay responsive to the flux induced in said receiver by alternating current in said inductor winding but not to flux created in the receiver by alternating current in the first receiver winding, an auxiliary circuit for said first relay including said train carried source and a front contact of said second relay, and governing means on the train controlled by said first relay.

4. Railway traffic controlling apparatus comprising a trackway inductor having a winding, means for at times supplying said winding with alternating current, a train-carried receiver having two windings, a circuit for the first of said receiver windings including a first relay and a source of current and a front contact of said relay, the effect of said trackway inductor on said receiver regardless of whether the inductor is energized or not being to reduce the current in said relay to such value that the relay will open, a second relay associated with the second receiver winding and arranged to be momentarily energized when the receiver passes the inductor if the inductor is energized but not if the inductor is de-energized, means operating when said second relay is energized to prevent opening of said first relay due to the co-action of the inductor and the receiver, and governing means on the train controlled by said first relay.

In testimony whereof I affix my signature.

LARS O. GRONDAHL.